(12) United States Patent
Langeslag

(10) Patent No.: US 6,965,204 B2
(45) Date of Patent: Nov. 15, 2005

(54) BALLASTING CIRCUIT FOR OPTIMIZING THE CURRENT IN THE TAKE-OVER/WARM-UP PHASE

(75) Inventor: Wilhelmus Hinderikus Maria Langeslag, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 10/493,792

(22) PCT Filed: Oct. 22, 2002

(86) PCT No.: PCT/IB02/04416

§ 371 (c)(1),
(2), (4) Date: Apr. 27, 2004

(87) PCT Pub. No.: WO03/039206

PCT Pub. Date: May 8, 2003

(65) Prior Publication Data

US 2004/0257000 A1   Dec. 23, 2004

(30) Foreign Application Priority Data

Oct. 31, 2001 (EP) .................................. 01204178

(51) Int. Cl.⁷ ............................................ H05B 37/00
(52) U.S. Cl. .................................. 315/209 R; 315/291
(58) Field of Search .............................. 315/291, 244, 315/225, 308, 307, 219, 209 R

(56) References Cited

U.S. PATENT DOCUMENTS

| 4,463,286 A | * | 7/1984 | Justice ..................... 315/219 |
| 5,434,479 A | * | 7/1995 | Ohnishi et al. .......... 315/209 R |
| 5,932,976 A | * | 8/1999 | Maheshwari et al. ....... 315/291 |
| 6,590,351 B2 | * | 7/2003 | Huber ...................... 315/291 |

FOREIGN PATENT DOCUMENTS

| EP | 0408121 B1 | 6/1995 | .......... H05B 41/29 |
| EP | 0893943 A1 | 1/1999 | .......... H05B 41/00 |

\* cited by examiner

*Primary Examiner*—Wilson Lee

(57) ABSTRACT

The invention relates to a ballast arrangement for igniting and operating a discharge lamp. The lamp is connected in a commutating bridge in series with an inductor and in parallel with a capacitor. The conductor and the capacitor jointly form a resonance circuit during an ignition phase. The bridge is then commutated at a comparatively high frequency. After the ignition phase, the lamp reaches a run-up phase, leading to a stable-operation phase. In the stable-operation phase, the bridge is commutated at a low frequency. According to the invention, the commutation frequency is lowered in steps from the comparatively high frequency during the ignition phase to the low frequency of the stable-operation phase so as to optimize current supply during the run-up phase.

1 Claim, 2 Drawing Sheets

BALLASTING CIRCUIT FOR OPTIMIZING THE CURRENT IN THE TAKE-OVER/WARM-UP PHASE

This application is a 371 of PCT/IB02/04416 dated Oct. 22, 2002.

BACKGROUND OF THE INVENTION

The invention relates to a ballast arrangement for a discharge lamp with resonant ignition, comprising a coil which is situated in a diagonal branch of a bridge-shaped commutation circuit, and which is arranged in series with the electrical lamp connections, and comprising a capacitor arranged in parallel with these connections, which commutation circuit supplies a comparatively low-frequency square-wave supply voltage of comparatively small amplitude to the lamp, and, in an ignition phase preceding the normal operating phase, the commutation circuit is commutated at a comparatively high frequency by a switching voltage at a switching frequency that changes with respect to time.

The invention more particularly relates to a ballast arrangement with resonant ignition of the lamp, wherein an ignition voltage causing ignition of the lamp is brought about across the electric lamp connections by electrically making resonant said coil and said capacitor. Such a ballast arrangement is disclosed, for example, in European patent application EP 0408121. In said application, it is described that the commutation circuit is commutated in an ignition phase at a time-variable switching frequency the frequency of which passes the resonant frequency of said coil and capacitor at some moment in time. It is an object of the invention to sufficiently heat the electrodes of the lamp in a so-termed take-over/warm-up phase between the resonant-ignition phase and the normal operating phase by means of glow discharges so as to attain a reliable transition to the normal operating phase without the supply circuit, which in turn feeds the commutation circuit, being excessively loaded.

According to U.S. Pat. No. 5,932,976, which also relates to resonant ignition and wherein also a circuit frequency of the commutation circuit which sweeps in frequency is employed, at the end of the frequency sweep, the frequency is maintained for some time at a frequency value close to the resonant frequency of the coil and the capacitor. As a result, however, the supply circuit, which in turn feeds the commutation circuit, is heavily loaded and the electrodes of the lamp are not effectively preheated.

SUMMARY OF THE INVENTION

The object in accordance with the invention is achieved by means of a ballast arrangement for a discharge lamp with resonant ignition as defined above, which commutation circuit is characterized in that, in a take-over/warm-up phase between said ignition phase and said normal operating phase, a supply voltage having a comparatively lower frequency than said comparatively high-frequency supply voltage is supplied to the lamp, the frequency of which, as compared to the frequency of said comparatively high-frequency supply voltage, is reduced by one frequency step in one or a number of time-sequential steps in order to each time optimize the current supplied to the lamp in the take-over/warm-up phase.

The inventors have found that, in the take-over/warm-up phase, by amplifying the voltage across the lamp capacitor by a factor of two independent of the switching frequency, the voltage across the capacitor is sufficient to bring about a transition take-over in the normal operating phase, so that the frequency can be chosen at which the current necessary for this phase is supplied to the lamp. This so-termed take-over current is higher as the switching frequency is lower, which phenomenon is used by the invention by reducing the switching frequency in phases and steps, as a result of which too large currents, such as might occur in the case of asymmetric behavior of the lamp in the take-over phase, which has a rectifier effect and hence may lead to unilateral large currents, can be precluded.

These and other aspects of the invention will be apparent from and elucidated, with reference to the embodiment(s) described hereinafter.

DETAILED DESCRIPTION OF THE PREFERRED EMBODIMENTS

Figure 1:
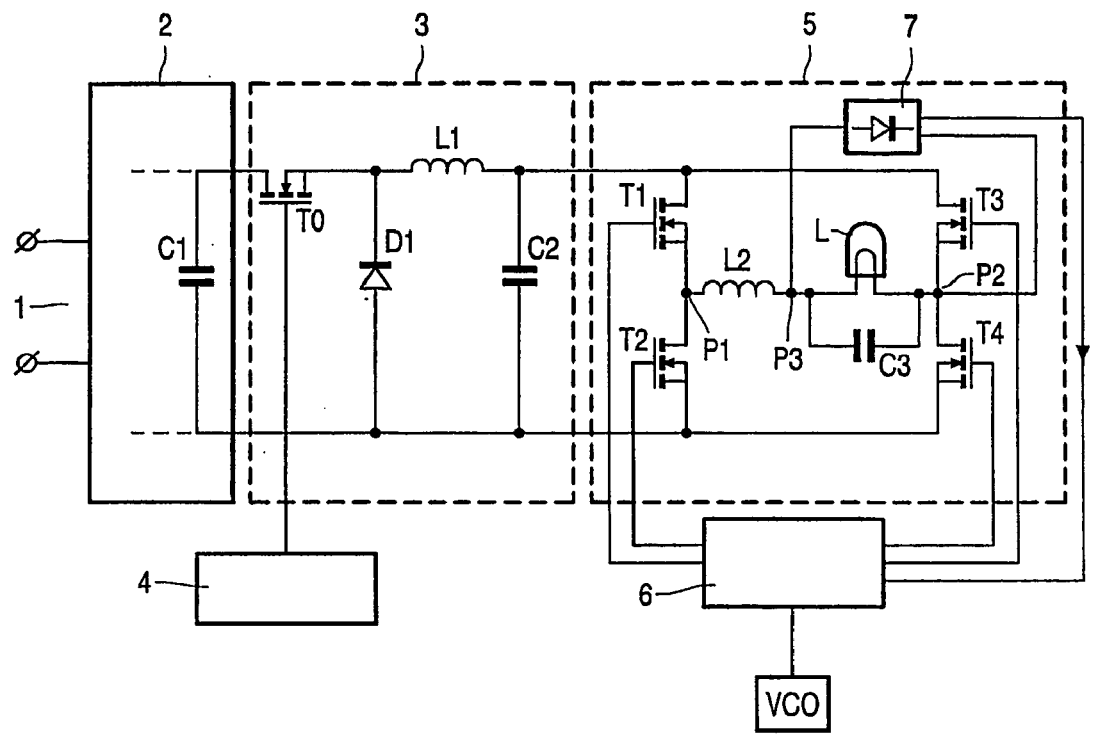
FIG. 1 shows the diagram of a customary ballast arrangement of a UHP lamp in a simplified presentation, wherein details that are not necessary for the understanding of the invention are omitted.

The ballast arrangement for a discharge lamp in accordance with FIG. 1 comprises an AC/DC converter circuit 2 connected to an AC voltage mains 1, which converter circuit comprises a capacitor C1 as the output capacitor.

A controlled/switched DC/DC converter circuit 3, also referred to as "chopper", is connected to the converter circuit 1, which chopper comprises a switched switching transistor T0, a diode D1, a coil L1 and an output capacitor C2. Under the control of the control circuit 4, this chopper is used, in known manner, inter alia to stabilize the lamp current in the normal operating phase wherein an arc discharge continually takes place in the lamp, i.e. the lamp is "on".

A commutation circuit 5 comprising switching transistors T1–T4 controlled by a control circuit 6 is connected to the chopper 3. In the diagonal branch P1–P2 of the bridge-shaped commutation circuit 5, there is a coil L2, which is connected in series with the electric lamp connections of the lamp L, and a lamp capacitor C3 which is parallel-connected to these connections.

The lamp L is, for example, a HID lamp or a UHP lamp. In the normal operating phase, wherein an arc discharge permanently takes place in the lamp L, so that the lamp is "on", the control circuit 6 supplies a comparatively low-frequency switching voltage to the switching transistors T1–T4, causing these to be switched on alternately and pairwise, T1, T4 and T2, T3, in a conducting manner, as a result of which a square-wave supply voltage of comparatively small or comparatively moderate amplitude is supplied to the lamp.

In the resonant-ignition phase, which precedes said normal operating phase, the control circuit 6 supplies a comparatively high-frequency switching voltage to the switching transistors T1–T4, the switching frequency varying with respect to time to (at least approximately) electrically make resonant the coil L2 and the capacitor C3 so as to generate an ignition voltage across the lamp L.

Figure 2:
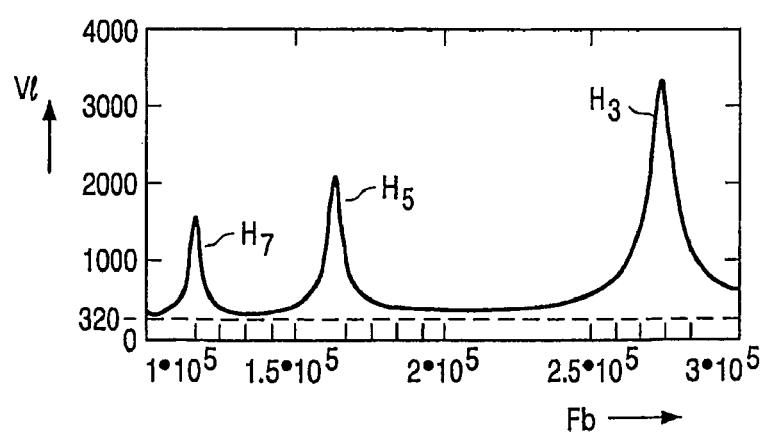
FIG. 2 shows the lamp voltage as a function of the switching frequency of the commutation circuit of FIG. 1.

The inventor has carried out experiments the result of which is shown in FIG. 2, and which have led to a new way of making resonant the coil L and the capacitor C3.

In said experiments, the lamp voltage VL was measured at no-load circuit as a function of the switching frequency fb with which the bridge-shaped commutation circuit 5 is commutated by the control circuit 6, and which will hereinafter be referred to as bridge frequency fb.

FIG. 2 shows the lamp voltage VL as a function of the bridge frequency fb in the case where L2=150 mH and C3=250 pF, i.e. for a natural resonant frequency f0=½ PI root LC of approximately 820 kHz. The voltage peaks indicated by means of H3, H5 and H7 occur at bridge frequencies fb at which L2-C3 starts resonating at, respectively, the third, fifth and seventh harmonic frequency of the bridge frequency. It has been found that the peak H3, which occurs if L2-C3 resonates at the third harmonic of the bridge frequency fb, i.e. if the bridge frequency fb, given the values of the self-inductance of the coil L2 and the capacitance of the capacitor C3, is chosen to be such that it amounts to one third of the natural resonant frequency of L2-C3, can deliver a sufficiently high ignition voltage for lamp L and, dependent upon the lamp type, possibly even an ignition voltage that is higher than necessary, and that, possibly, also the peaks H5 and H7 can do so, which is certainly the case if as a result of further development of the UHP and HID lamps, the required value of the ignition voltage of these lamps can decrease.

Figure 3:
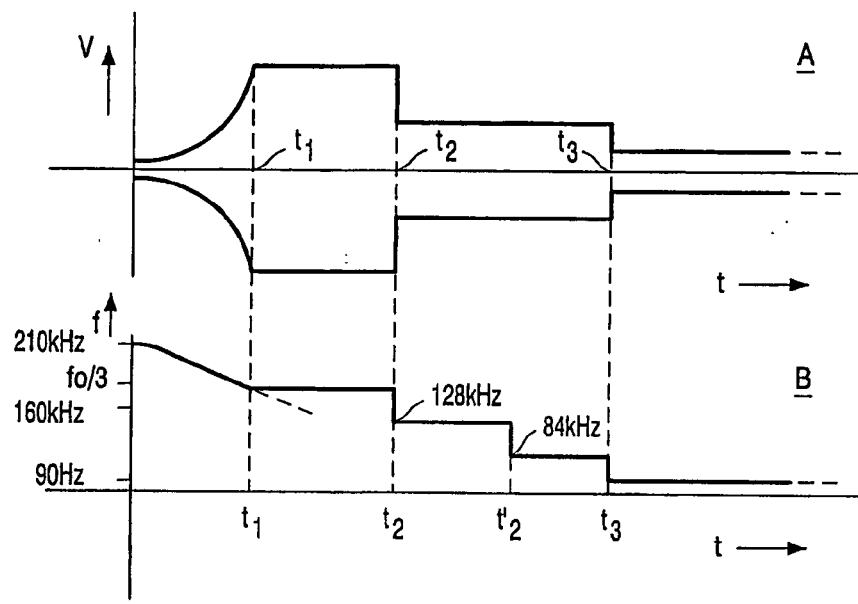
FIG. 3 is a schematic representation of the various operating phases of the ballast arrangement in the course of time, wherein the voltage amplitude and switching frequencies are diagrammatically indicated.

These results lead to a manner of operating discharge lamps that is diagrammatically shown in FIG. 3.

In FIG. 3A, a voltage amplitude V at no-load circuit is vertically plotted and the time t is horizontally plotted, and in FIG. 3B, the frequency f is vertically plotted and the time t is horizontally plotted (the drawings are not to scale; they only serve as an explanatory diagrammatic representation).

The normal operating phase, wherein the lamp is continually "on", starts from the instant t3, in which phase a comparatively low-frequency square-wave supply voltage having a frequency of, for example, 90 Hz is supplied to the lamp with a comparatively small amplitude.

The phase in question, i.e. the ignition phase, runs from the beginning to t2, with t1 being a significant intermediate instant. In this phase, the commutation circuit 5 is operated at a time-variable bridge frequency fb up to the intermediate instant t1, with fb varying from, for example, 210 kHz to 160 kHz, the values used for L2 and C2 being, respectively, 250 $\mu$H and 330 pF, leading to a resonant frequency fo of L2-C3 of approximately 554 kHz, so that at any moment in time, the bridge frequency fb may attain a value (approximately 554/3=185 kHz) at which the third harmonic frequency of the bridge frequency fb is equal to the resonant frequency f, and a voltage peak (H3, FIG. 2) capable of igniting the lamp develops across capacitor C3. In this connection it is to be noted that as soon as the third harmonic frequency of the bridge frequency approaches the resonant frequency fo, but is still at some distance (for example 1 kHz or more) from said resonant frequency, a sufficiently high ignition voltage may already develop across the lamp capacitor.

It is advantageous that by virtue of the 3:1 ratio of the resonant frequency f0 to the bridge frequency fb, the self-inductance of the coil L2 and the capacitance of the capacitor C3 can be dimensioned to values that are much lower than the values that would be possible at the customary ratio of 1:1, and that, in spite of this, resonant ignition can be brought about at a bridge frequency that is not extremely high.

FIG. 3A illustrates the voltage across the lamp that increases up to the instant t1, the ignition voltage occurring at a moment when the bridge frequency fb is close to one third of the resonant frequency f0, or put differently, when the third harmonic of fb is close to fo. This moment is detected by a voltage level-detection circuit 7 (FIG. 1) that is switched across the lamp connections P3, P2 and that comes into action at a certain level of the voltage between P3 and P2 and, in that case, stabilizes this voltage at at least approximately said value, and, after coming into action, said detection circuit 7 supplies an indication signal to the control circuit 6, as a result of which the latter keeps a voltage-controlled oscillator VCO, which is connected to or accommodated in said control circuit, and from which the bridge frequency fb is derived, at the attained frequency, which is at least close to one third of the resonant frequency fo, up to the instant t2.

For the purpose of illustration, it is mentioned that the length of time from t1 to t2 may be, for example, 500 ms to bring about reliable ignition, and that the length of time from the beginning to t1, which is not critical either, may be, for example, 100 ms.

What has been mentioned hereinabove with regard to the third harmonic applies mutatis mutandis to the fifth and seventh harmonics if the peaks H5 and H7, respectively, (FIG. 2) can supply a sufficiently high ignition voltage, and none of the values indicated above, which are given only for the purpose of illustration, should be interpreted in a limiting sense, and also the values of the times 0–t1, t1–t2 are for illustrative purposes only and can be experimentally determined, if necessary.

It is important to introduce a warm-up and/or take-over phase between the ignition phase of resonant ignition (0–t2, FIG. 3A) and the normal operating phase wherein the lamp is "on" (after t3), in which warm-up and/or take-over phase the lamp electrodes are warmed up by glow discharges.

After ignition, the lamp almost constitutes a short-circuit (resistance approximately 1 ohm), and if the no-load voltage across the lamp is generated near the third harmonic and the lamp becomes a short-circuit, the chopper or control stage 3 connected to the commutation circuit 5 supplies a comparatively low peak current which, in practice, is below 1 ampere. To warm up the electrodes of the lamp, however, a higher peak value is required, in practice for example approximately 2 ampere, and a sufficiently high voltage across the output capacitor C2 of control stage 3 is required.

The graph in FIG. 2 of the lamp voltage VL at no-load circuit versus the bridge frequency fb, which graph results from experiments carried out by the inventor, shows that the lamp voltage is always above the level indicated by means of an interrupted line, in this specific case 320 volt, at a voltage across the output capacitor C2 of approximately 160 volt.

Figure 4:
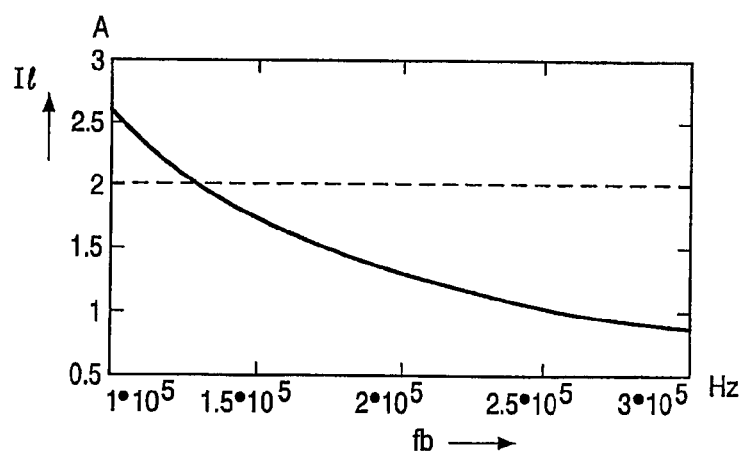
FIG. 4 shows the lamp current in the take-over/warm-up phase as a function of the switching frequency.

Further experiments have led to the graph shown in FIG. 4, wherein the lamp current I1 is plotted versus the bridge frequency fb. This graph shows that in order to achieve a desired current level the bridge frequency must be reduced.

Figure 5:
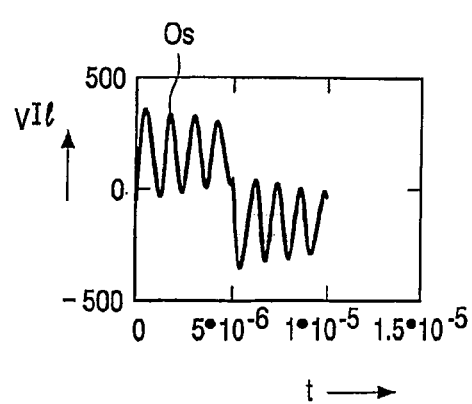
FIG. 5 shows the lamp voltage in the take-over phase as a function of time.

The voltage V1 across the lamp as a function of time is shown in FIG. 5 during 1 period of a bridge frequency of, for example, 100 kHz, the oscillation Os shown having a frequency equal to the resonant frequency fo of L2-C3.

Thus, the resonant circuit L2-C3 is excited by the signal of 100 kHz, and an oscillation OS having twice the value of the peak voltage across output capacitor C2 of the control stage 3 develops across capacitor C3, as a result of which a lower voltage on the output capacitor C2 is sufficient.

As shown in FIG. 3B, at the instant t2, the bridge frequency fb of the frequency of approximately f0/3 (for example 283 kHz) attained at the instant t1 is reduced in one step to, for example, 128 kHz in order to optimize the current supplied to the lamp in this phase, and it may be taken into account, for example, that asymmetric behavior of the lamp may lead to too large asymmetric currents. At the instant t2', the bridge frequency is possibly further reduced in one step to, for example, 84 kHz in order to allow larger (symmetric) currents that promote the transition to the normal operating phase at the instant t3. The duration t2–t3 may be, for example, 1 second.

It is to be noted that the choice of the number and sizes of the frequency steps in the period of time t2–t3 can be optimized for the current necessary, and that the above-mentioned, purely illustrative data should not be interpreted in a limiting sense as regards the number and sizes of the frequency steps.

With reference to FIG. 3A, it is further noted that up to t3, the voltage at no-load circuit, i.e. in the non-ignited state of the lamp, is shown; after breakdown, the voltage is much lower. In practice, the lamp can go out again between t1 and t3. As, in this case, a minimum voltage in excess of approximately 300 V (FIG. 3 and FIG. 5) is always available, as mentioned above, the lamp will go "on" again. If the lamp does not remain on after the instant t3, which can be determined in known manner, the entire procedure described above (FIG. 3B) is repeated at intervals.

The above description regarding the variation of the bridge frequency fb in said ignition and take-over/warm-up phase should allow people skilled in the art to correspondingly program, in a fixed or variable manner, a control circuit 6 provided with a VCO, for example in the form of a microcontrol unit (microcontroller) or microprocessing unit (microprocessor), in such a manner that the suitable switching voltage is supplied to the commutation circuit 5. People skilled in the art should also be able to choose a voltage detection circuit 7 with indication signal, which may be of a very customary type.

In summary, the measure in accordance with the invention provides a ballast arrangement the advantages of which are that it comprises a small-size coil which is arranged in series with the lamp connections and a small-size capacitor which is arranged in parallel with the lamp connections, and the lamp can be reliably ignited near an odd harmonic frequency of the bridge frequency, and the voltage and optimized current are sufficiently high in the take-over/warm-up phase.

What is claimed is:

1. A ballast arrangement for a discharge lamp with resonant ignition, comprising a coil which is situated in a diagonal branch of a bridge-shaped commutation circuit, and which is arranged in series with the electrical lamp connections, and comprising a capacitor arranged in parallel with these connections, which commutation circuit supplies a comparatively low-frequency square-wave supply voltage of comparatively small amplitude to the lamp in the normal operating phase of the lamp wherein an arc discharge continuously takes place in the lamp, and which commutation circuit supplies, in an ignition phase preceding said normal operating phase, a comparatively high-frequency supply voltage to the lamp which causes said coil and said capacitor to become electrically resonant, characterized in that, in a take-over/warm-up phase between said ignition phase and said normal operating phase, a supply voltage having a comparatively lower frequency than said comparatively high-frequency supply voltage is supplied to the lamp, the frequency of which, as compared to the frequency of said comparatively high-frequency supply voltage, is reduced by one frequency step in one or a number of time-sequential steps in order to each time optimize the current supplied to the lamp in the take-over/warm-up phase.

* * * * *